United States Patent

[11] 3,537,501

| [72] | Inventor | Bush A. Johnson<br>P. O. Box 451, Norfolk, Nebraska 68701 |
|---|---|---|
| [21] | Appl. No. | 747,567 |
| [22] | Filed | July 25, 1968 |
| [45] | Patented | Nov. 3, 1970 |

[54] TRACTOR TIRE BEAD BREAKER
6 Claims, 4 Drawing Figs.

[52] U.S. Cl. ............................................. 157/1.17
[51] Int. Cl. ............................................. B60c 25/06
[50] Field of Search ............................................. 157/1.1, 1.17

[56] References Cited
UNITED STATES PATENTS

| 2,520,330 | 8/1950 | Northrup et al. | 157/1.17 |
| 2,606,602 | 8/1952 | Manupello | 157/1.17 |
| 2,679,896 | 6/1954 | Branick | 157/1.17 |
| 2,753,923 | 7/1956 | Bowyer | 157/1.17 |
| 2,901,029 | 8/1959 | Mraz | 157/1.17 |

Primary Examiner—Granville Y. Custer, Jr.
Attorneys—Clarence A. O'Brien and Harvey B. Jacobson ABSTRACT: A three-pronged apparatus whose prongs generally parallel each other and are initially supported relative to each other in spaced-apart relation in the same general plane and which are adapted to be endwise wedged by hammering or other force means between a wheel flange and an associated tire casing bead portion, the remote prongs being stationarily supported relative to each other and the center prong being mounted for movement relative to the other prongs in a path disposed generally normal to the plane in which the prongs are disposed initially and the device including force means for shifting the center prong relative to the other prongs.

Patented Nov. 3, 1970

Bush A. Johnson
INVENTOR.

BY Clarence A. O'Brien
and Harvey B. Jacobson
Attorneys

Bush A. Johnson
INVENTOR.

TRACTOR TIRE BEAD BREAKER

The tire bead breaker of the instant invention has been designed primarily for assisting in "breaking" tire casing sidewall portions from associated wheel flange portions. Specifically, the tire bead breaker has been designed for use on large tires such as tractor tires, thereby enabling tractor tires to be repaired without removing the wheel of the tractor and hauling it to a tire repair garage or the like. By providing a tool such as the tire bead breaker of the instant invention, large tires such as tractor and truck or earth-moving equipment tires may be "broken" from the flange portions of the associated wheel enabling repairs to be made upon the tire or a tube disposed therein without removing the wheel from the associated vehicle. Repair of the tire or tube disposed therein in this manner greatly reduces the "shutdown time" of the vehicle upon which the tire is mounted.

The main object of this invention is to provide a readily portable tool which will be operative to provide an efficient means whereby bead portions of tire casings may be "broken" from the retaining flange portions of an associated wheel rim.

Still another object of this invention is to provide a tool in accordance with the preceding object and including tire bead and wheel flange engaging portions which may be readily wedged between confronting tire bead and wheel flange portions.

A final object of this invention to be specifically enumerated herein is to provide a tool in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
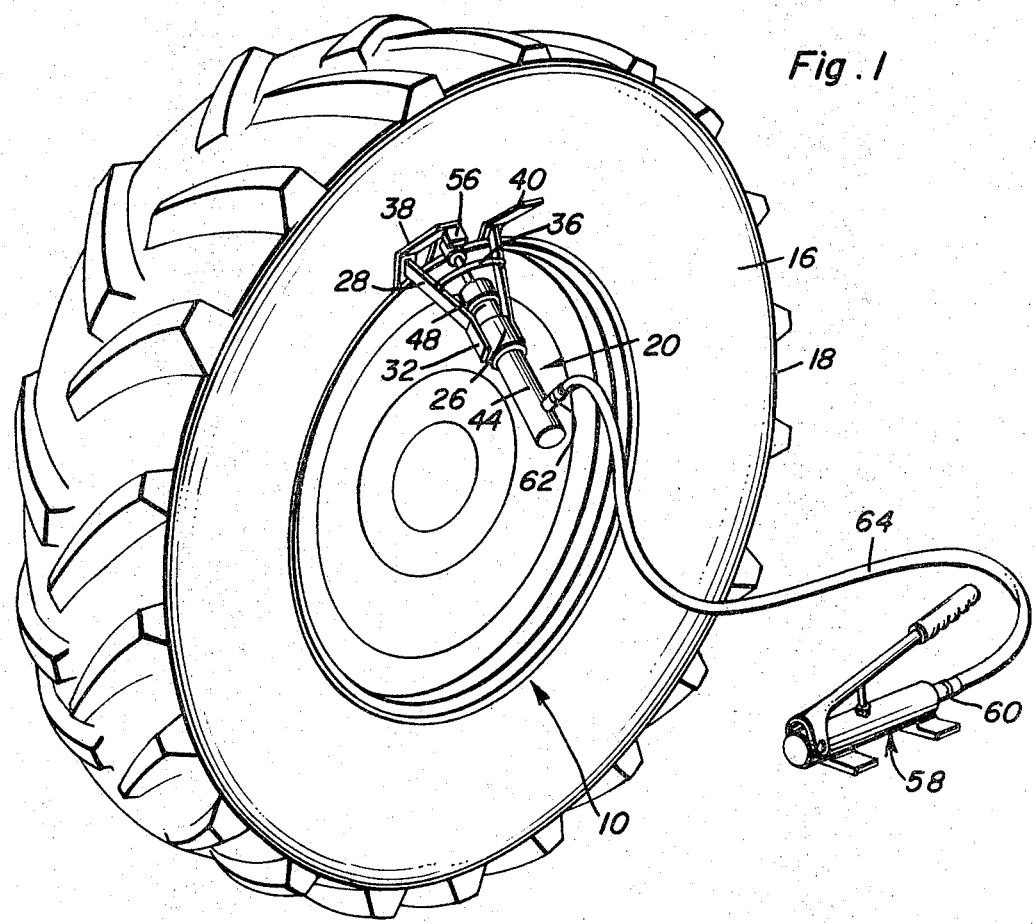
FIG. 1 is a perspective view of a large size vehicle wheel and tire combination with the tool of the instant invention positioned for separating the outer bead portion of the tire casing from the corresponding retaining flange portion of the wheel.
Figure 4:
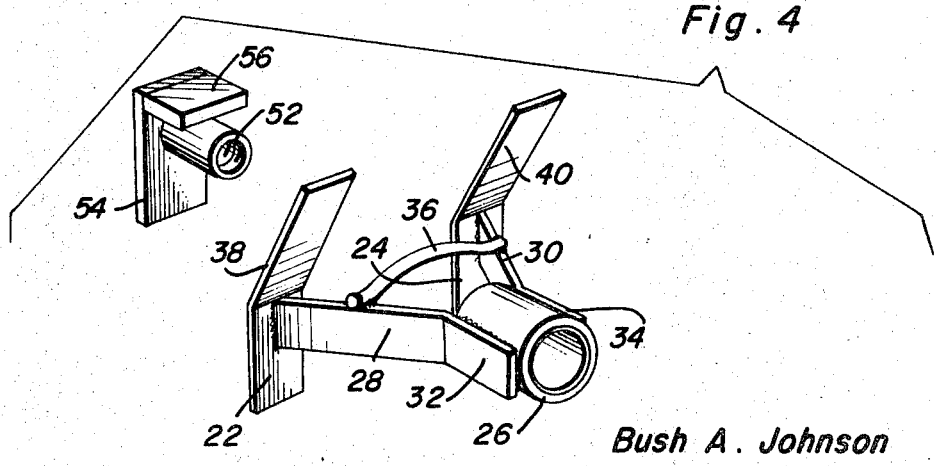
FIG. 4 is an exploded perspective view of the wheel rim and tire casing engaging portions of the tool.
Figure 2:
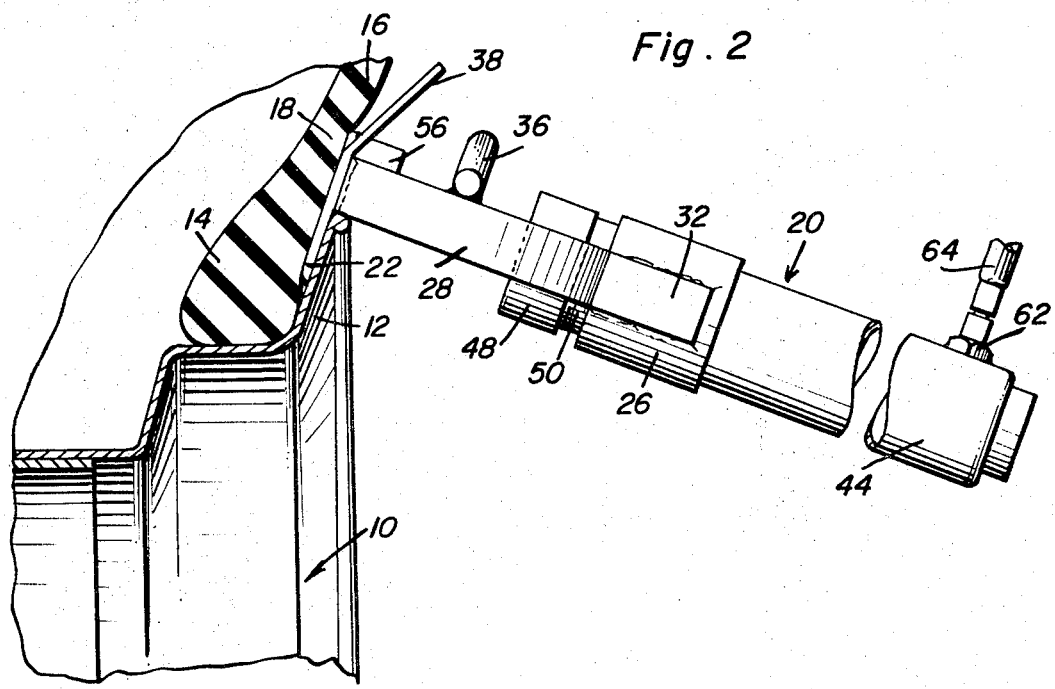
FIG. 2 is an enlarged fragmentary vertical sectional view taken substantially upon a plane passing through the center of the tool illustrated in FIG. 1.
Figure 3:
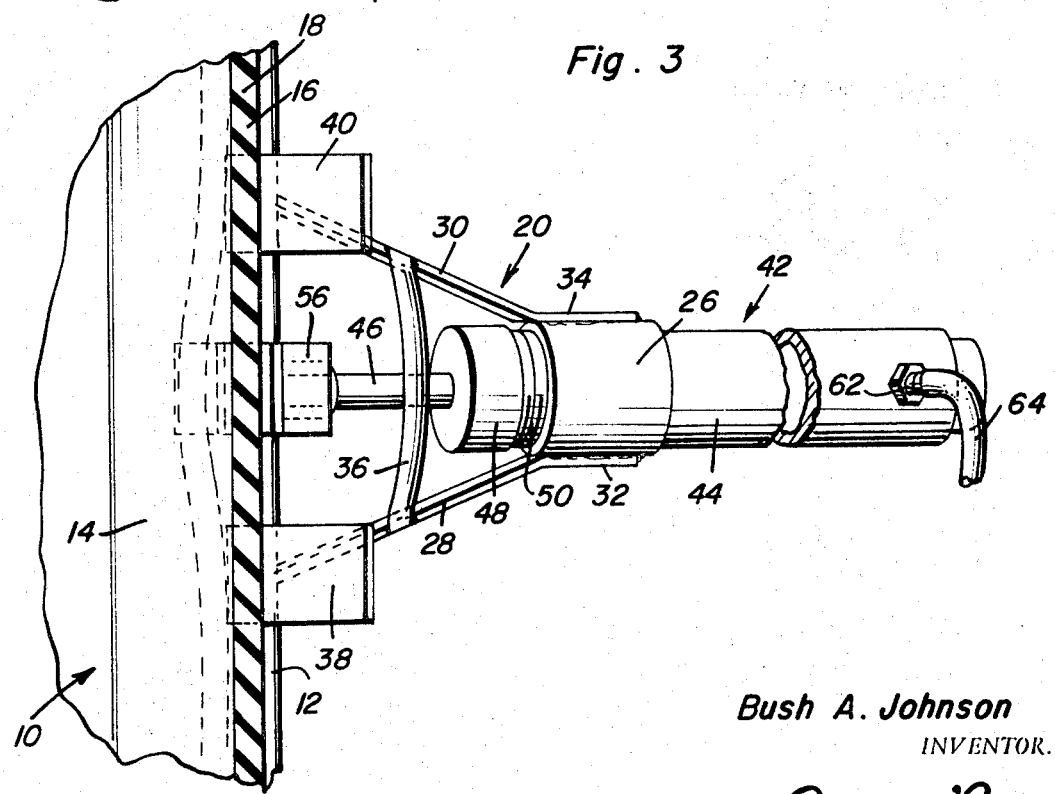
FIG. 3 is an enlarged fragmentary horizontal sectional view taken substantially upon a plane passing through the wheel of FIG. 1 at an elevation slightly above the tool.

Referring now more specifically to the drawings, the numeral 10 generally designates a tractor wheel including a retaining flange portion 12 which holds captive the bead portion 14 of the outer sidewall 16 of a tire casing 18 mounted upon the wheel 10. The tool of the instant invention is referred to in general by the reference numeral 20 and includes a pair of wheel-retaining flange portions 22 and 24 supported outwardly of one end of a tubular bushing 26 and on opposite sides of the busing 26 by means of divergent support arms 28 and 30 whose remote ends are secured to the flange portions 22 and 24 and whose adjacent ends include angulated generally parallel end portions 32 and 34 secured to diametrically opposite side portions of the bushing 26.

A transverse brace 36 is secured between the outer end portions of the support arms 28 and 30 and the flange portions 22 and 24 include slightly angulated rear end portions 38 and 40.

A hydraulic ram generally referred to by the reference numeral 42 is provided and includes a cylinder portion 44 from which an extendable piston rod portion 46 projects. An apertured end cap 48, through which the piston rod portion 46 is slidably received, is internally threaded and threaded on an externally threaded end portion 50 of the cylinder portion 44 with the bushing 26 held captive on the cylinder portion 44 by the end cap 48. The bushing 26 is freely slidable along the outer surface portions of the cylinder portion 44 and the end cap 48 comprises a removable abutment preventing withdrawal of the bushing 26 from the corresponding end of the cylinder portion 44.

The outer free end of the piston rod portion 46 is externally threaded and has an internally threaded sleeve portion 52 supported from a third flange portion 54 threadedly engaged thereon. The rear end of the third flange portions 54 includes a right-angled abutment flange portion 56 and a manually actuatable fluid pump assembly generally referred to by the reference numeral 58 has its fluid outlet 60 communicated with the fluid inlet 62 of the hydraulic ram 42 by means of a flexible hydraulic pressure line 64.

In operation, the tool 20 is assembled in the manner illustrated in FIG. 1 of the drawings and the flange portions 22, 24 and 54 are positioned with their forward edge portions abutting and slightly inclined relative to the portions of the sidewall 16 immediately adjacent the outer circumferential portion of the retaining flange portion 12. Then, an impact tool such as a hammer is utilized to strike the free ends of the angulated rear end portions 38 and 40 and the abutment flange portion 56 so as to wedge the three flange portions 22, 24 and 54 between the bead portion 14 and the retaining flange or flange portion 12. Thereafter, the manually actuatable hydraulic pump 58 is actuated which will cause the piston rod portion 46 to be extended and thus the flange portion 54 to push inwardly on the bead portion 14 while the flange portions 22 and 24 apply force outwardly on the opposing inner surface portions of the retaining flange portion or flange 12. Continued operation of the fluid pump 58 will of course cause the flange portion 54 to be shifted sufficiently relative to the flange portions 22 and 24 so as to inwardly deflect the adjacent bead portions 14 of the tire casing 18 from the corresponding retaining flange portions 12 of the wheel 10.

If a single operation of the tool 20 is not sufficient to break the entire periphery of the bead portion 14, after each bead portion 14 has been broken away from the flange 12, the tool 20 may be slightly circumferentially shifted about the periphery of the wheel 10 and again actuated until the entire bead portion 14 is broken away from the rim 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

I claim:

1. A tire bead breaking tool comprising a tubular sleeve including front and rear ends, an elongated longitudinally extendable fluid motor including front and rear, relatively extendable, opposite end portions, said rear end portion projecting forwardly through and slidably received in said sleeve with the front end portion of said motor being forwardly extendable away from and retractable rearwardly toward the front end of said sleeve, the forward terminal end portion of said rear end portion including a removable abutment member engageable with the front end of said sleeve to prevent rearward displacement of said rear end portion from within said sleeve, a pair of opposite side support arms having one pair of corresponding base end portions thereof secured to diametrically opposite portions of said sleeve with the other pair of free ends of said arms projecting endwise outwardly of said front end of said sleeve and divergent to opposite sides of the center axis of said sleeve, said free ends of said arms including spaced-apart, generally coplanar, flange portions supported therefrom, disposed generally normal to said center axis and projecting outwardly to one side of a plane containing said arms, the free end of said front end portion of said fluid motor including a third laterally outwardly projecting flange generally paralleling, spaced from and disposed between said pair of flanges, and elongated transverse brace means extending between and secured at its opposite ends to said arms intermediate their opposite end.

2. The combination of claim 1 wherein said elongated transverse brace means is bowed so as to be outwardly convexed to the other side of said plane.

3. The combination of claim 1 wherein said arms include generally parallel angulated end portions on said base ends thereof generally paralleling and secured to opposite side outer surface portions of said sleeve.

4. The combination of claim 1 wherein the flanges carried by said arms include rear end portions thereof projecting outwardly to the other side of said plane and which are inclined toward said other end portion of said fluid motor at their free ends.

5. The combination of claim 4 wherein said third flange also includes a rear end portion projecting to the other side of said plane and which is adapted to be struck by an impact tool.

6. The combination of claim 1 wherein said elongated transverse brace means is bowed so as to be outwardly convexed to the other side of said plane, said arms including generally parallel angulated end portions on said base ends thereof generally paralleling and secured to opposite side outer surface portions of said sleeve, the flanges carried by said arms including rear end portions thereof projecting outwardly to the other side of said plane and which are inclined toward said other end portion of said fluid motor at their free ends.